United States Patent [19]
Bodine et al.

[11] 4,088,011
[45] May 9, 1978

[54] GASOLINE ENGINE PISTON POSITION TESTER

[76] Inventors: Kenneth E. Bodine, 660 E. Geddes, Littleton, Colo. 80122; Verle A. McDowell, 4675 S. Lincoln, Englewood, Colo. 80110

[21] Appl. No.: 766,448

[22] Filed: Feb. 7, 1977

Related U.S. Application Data

[63] Continuation-in-part of Ser. No. 598,707, Jul. 24, 1975, abandoned.

[51] Int. Cl.² ............................................. G01M 15/00
[52] U.S. Cl. .................................. 73/116; 200/82 D; 200/83 N
[58] Field of Search ................... 73/116, 115, 118, 47; 116/124 D; 200/83 N, 83 R, 82 D; 324/16 T

[56] References Cited

U.S. PATENT DOCUMENTS

| | | | |
|---|---|---|---|
| 1,789,593 | 1/1931 | Murphy | 116/124 D |
| 2,014,115 | 9/1935 | Pickron | 73/116 |
| 2,072,984 | 3/1937 | Haskins | 73/116 |
| 2,096,803 | 10/1937 | Hantjopoulos | 73/115 |
| 2,098,058 | 11/1937 | Morgan | 73/116 |
| 2,111,168 | 3/1938 | Chansor | 200/83 N |
| 2,149,620 | 3/1939 | Museus | 200/82 D |
| 2,579,710 | 12/1951 | Spadola | 116/124 D |
| 3,100,988 | 8/1963 | Mansfield | 73/116 |
| 3,127,586 | 3/1964 | Heyn et al. | 200/83 N |

*Primary Examiner*—Anthony V. Ciarlante
*Attorney, Agent, or Firm*—Richard D. Law

[57] ABSTRACT

A hollow, imperforate chamber arranged to be connected to a cylinder, includes a gas pressure deformable membrane detector providing means to actuate a signal indicating pressure in the cylinder produced by a piston moving in its compression cycle. The detector is connected into the electrical system of the engine to utilize its lights or horn as an indicating signal.

1 Claim, 5 Drawing Figures

GASOLINE ENGINE PISTON POSITION TESTER

This application is a continuation in part of our patent application Ser. No. 598,707, filed July 24, 1975 now abandoned, for Gasoline Engine Piston Position Tester.

PRIOR ART

Several piston pressure detectors are shown in the prior art. A list of the pertainent patents are as follows:

1. U.S. Pat. No. 3,100,998 — Mansfield — 8/20/75
2. U.S. Pat. No. 2,014,115 — Pickron — 9/10/35
3. U.S. Pat. No. 2,098,058 — Morgan — 11/2/37
4. U.S. Pat. No. 1,789,593 — Murphy — 1/20/31
5. U.S. Pat. No. 2,072,984 — Haskins — 3/9/37
6. U.S. Pat. No. 2,096,803 — Hantjopoulos — 10/26/37
7. U.S. Pat. No. 2,579,710 — Spadola — 12/25/51

These patents are classified in class 73, sub-classes 115, and 116 and class 116, sub-class 124D.

Of the patents, only the Mansfield disclosure shows a tip, but it is not mounted on a small tubular body, but is mounted on the lower end of a long tube leading to a pressure gauge. This leaves a substantial volume of air or a gas to bear against the pressure gauge. A relatively small amount of gas exhausts from the cylinder and the true pressure could not normally be found. Also, in Mansfield, there is no electrical switch contacts in the tube or guage. A separate starter switch is used. Of the remaining patents, none shows a diaphragm having the characteristics or separate working pressure and ambient pressure chambers sealed from each other. The Haskins patent has a diaphragm, but in reality has no working pressure chamber in communication with a single inlet. There is no switch contact and diaphragm relationship in the patent. The signals used by the devices of the patents are independant of the automobile electrical system. Thus Mansfield uses a gauge, Spadola uses a whistle and Hantjopoulous uses a separate signal circuit.

In timing a gasoline, internal combustion piston engine, usually after a major overhaul, it is important to know the position of the piston in the cylinder designated as No. 1 in the firing order. Timing for the remainder of the cylinders is based on this No. 1 cylinder, and therefore the ignition sparking from the distributor must be exact with the position of the piston in the No. 1 cylinder. The firing of the spark plug is initiated a few degrees before dead-top center of the piston on its compression stroke. The distributor, on the other hand, is connected by gears and chains to the crank shaft so that the firing of the other cylinders automatically follow the setting of the No. 1 cylinder.

When a sole mechanic tries to time an engine, it has been found that the engine being tuned is normally turned by keying the starter with the ignition key in the driver's compartment. This, of course, is a considerable distance from the engine and the mechanic cannot ascertain the position of the piston nor of the cycle on which the piston is in. Under normal conditions a second mechanic is used to "feel" the position as the other mechanic keys the starter.

According to the present invention, there is provided a tester for the pressure in a cylinder of an internal combustion engine by replacing the cylinder spark plug with the tester of the invention. The tester has a flexible, resilient tip which frictionally fits in the spark plug bore to establish communication with the cylinder and permit a build up of gas pressure in the cylinder and tester. A pressure detector in the tester is arranged to initiate a signal, either oral or visual or both. Thus, a sole mechanic may install the tester in the No. 1 cylinder and key the starter from the driver's seat. The tester indicates when the piston is coming up on its compression stroke. A mechanic may then "feel" the final adjustment of the position of the piston for timing, knowing it is on its compression stroke. The timing of the engine may then proceed normally thereafter.

Included among the objects and advantages of the invention is to provide a testor for determining the compression stroke of an internal combustion gasoline engine piston.

Another object of the invention is to provide a tester arranged to be connected into an automobile electrical system using its horn or lights to actuate an oral or visual signal when a piston of an internal combustion engine is moving upwardly on its compression stroke.

Still another object of the invention is to provide a tester for a piston's compression stroke of an internal combustion engine arranged to simply and easily frictionally fit in a spark plug bore essentially without gas leakage.

Another object of the invention is to provide a compression tester for an internal combustion engine arranged to be accommodated in the spark plug bore of various types and designs of engines.

These and other objects and advantages of the invention may be readily ascertained by referring to the following description and appended illustrations in which.

Figure 1:
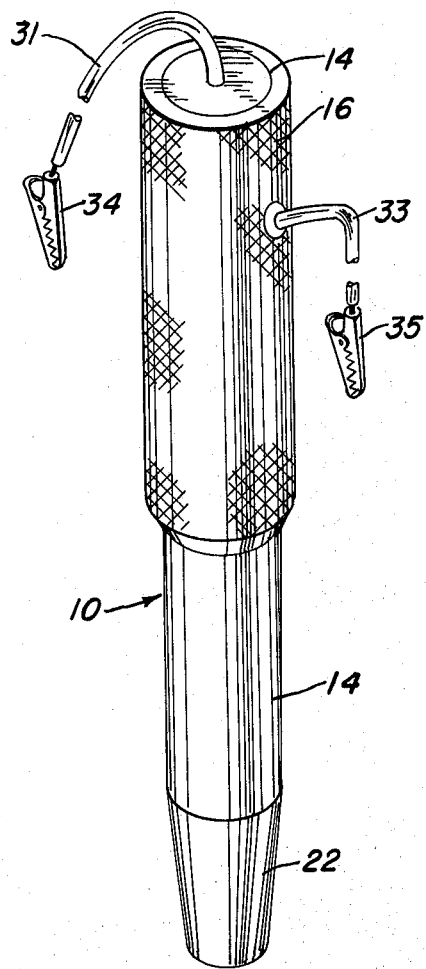
FIG. 1 is a perspective view of one form of tester according to the invention.
Figure 2:
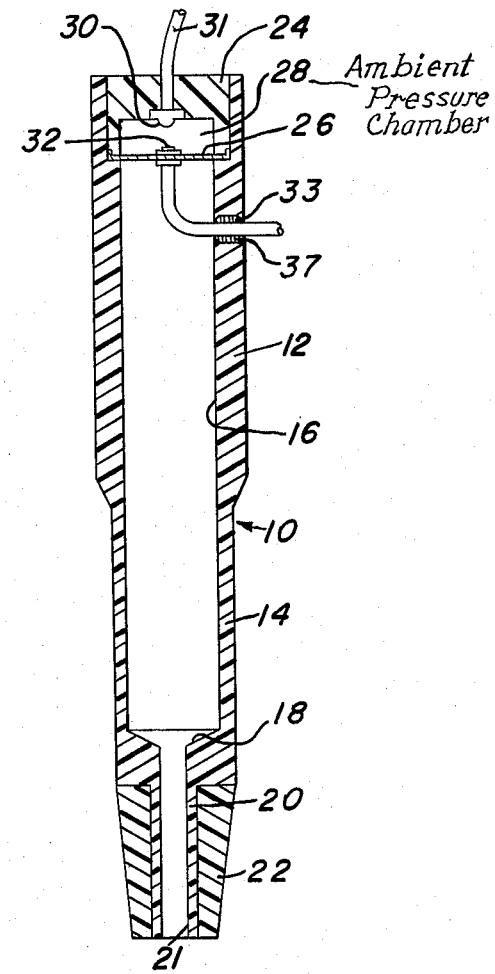
FIG. 2 is a cross-sectional, side-elevational view of a V-tester of FIG. 1.
Figure 3:
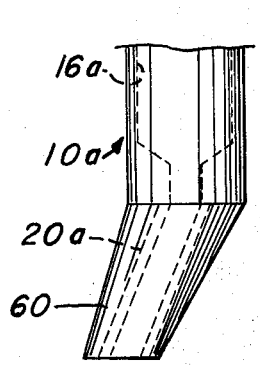
FIGS. 3, 4 and 5 are side-elevational views of adapter tip for the tester providing accommodation of the tester to various designs of internal combustion engines.

In the device selected for illustration in FIGS. 1 and 2, an elongated, hollow body, shown in general by numeral 10, includes a handle portion 12 and an extension portion 14. The handle and extension portions are hollow providing an eleongated passage 16 therein. The exterior of the handle is knurled to prevent slipping. The passage 16 terminates in a shoulder 18 which necks down to a tip holding extension 20, which is, likewise, a tubular hollow member. A flexible resilient tip 22 extends around extension 20 and provides means attaching the same to an engine, explained below. A cap 24, at the upper end of the handle section 12, closes the tubular chamber 16 providing an imperforate member except for the outlet to passage 21 through the tip 20. A flexible, resilient, impervious membrane 26 is secured between the cap 24 of the body portion 12 providing a space 28 therein which is maintained separate from the space of the passage 16 and is arranged so it is not air tight but is at ambient pressure. An electrical contact 30 is mounted in the cap 24 and an electrical contact 32 is mounted in the diaphragm 26. A lead 31 from the contact 30 extends to an alligator clamp 34. A lead 33 extends to an alligator clamp 35 at its end. A flexible bushing 37 seals the lead 33 into the body 12 and prevents a flow of gas therethrough. By affixing the lead 33 to the top of contact 32, both leads 31 and 33 could extend out of the cap 24.

The body 10 of the tester may be made of a material sufficiently rigid to maintain its shape with a reasonable pressure therein, and may be made of such materials as metal, plastic, rubber, or the like. The tip 22 is preferably a soft, resilient material which may be forced into a spark plug bore and seal against the threads therein to generally prevent the loss of pressure in the cylinder. This provides means for the communication of the device with the pressure in the cylinder. A neoprene tip has been found advantageous for the device.

The tester has several features and characteristics, including:

1. It is designed to use the existing electrical circuit of the automobile and requires no exterior power source. This greatly simplifies use of the device and eliminates the need for self-powering batteries that might weaken or fail over time, or the need to be near an electrical outlet.

2. It is designed to use the horn or light circuit of the automobile as a signal device that can be easily detected by a sole operator working on the automobile engine.

3. The electrical contacts of the tester are housed within a closed ambient pressure chamber, so that dirt and the like cannot reach and contaminate them, and to prevent other damage thereto.

4. The tester is designed with a soft, resilient tip of neoprene or the like, which serves both to easily fit the tester into a spark plug hole in a gas-tight manner, and to essentially electrically isolate the tester from the engine block. This eliminates any significant escape of possible explosive gas mixtures, and possible accidental grounding or sparking.

5. The tester utilizes a flexible, resilient, impervious diaphragm as its only working element, and such assures sensitive response to gas pressures and at the same time prevents any escape of the gases being sensed. This contributes to both the safety and the sensitivity of the tester.

6. The tester, when used as intended, eliminates the need for a mechanic to use the usual strobe light and is rugged enough to be carried in the tool box without concern for damage.

In use of the device, the spark plug from the No. 1 cylinder is removed and the tester is placed with its tip in the spark plug bore providing a friction fit, and the "feeling" of the spark plug bore may proceed. The alligator clamps may then be placed one on a hot line and the other either on a line to the automobile horn or the line of a headlight. The mechanic may then key the starter to turn over the engine, and when the No. 1 piston starts up on its compression stroke the air or gas in the chamber 16 is compressed by the gas in the cylinder. When sufficient pressure has been built up, the diaphragm 26 is extended upwardly so that the contact 32 touches the contact 30 completing the circuit. In the case of the horn connection, the horn is actuated. When hooked to a line for a headlight, light is actuated, depending upon the desires of the mechanic. When the signal is given the mechanic knows that the piston is moving upwardly on its compression stroke and the tester may then be removed and the mechanic can then move the piston up to its point for the initiation of the sparking for the spark plug. In that position the proper timing sequence of firing of the other spark plugs through the distributor.

Figure 4:
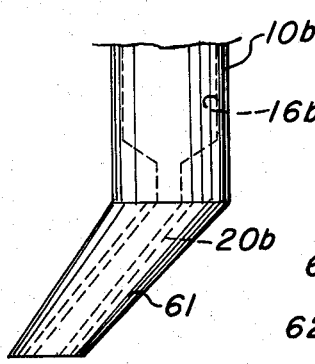
Figure 5:
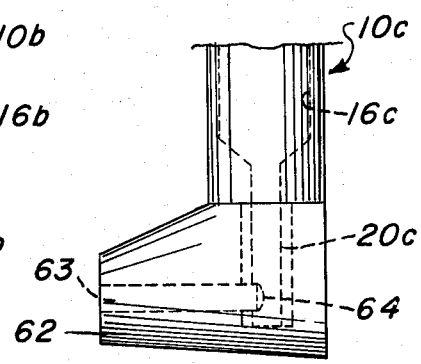

The design of some internal combustion engines places the spark plug bores in unusual positions and in unusual configurations. To accommodate some of these designs the tip of a testing unit may be deflected at an angle form the longitudinal axis of the unit. As shown in FIG. 4, a tester, shown in general by numeral 10a, is provided with an extension tube 20a which extends at about a 30° angle from the axis through the passage 16a. A tip of soft, flexible, resilient material is placed around the extension 20a to provide a tip which is about a 30° angle to the body of the unit. In FIG. 5, a body 10b is provided with an extension tube 20b which extends at about a 45° angle to the axis of the passage 16b, and a tip 61 covers the extension 20b to provide a unit, which is useful for placing in spark plug bores mounted at about 45° to vertical. In FIG. 6 a body 10c of a tester provided with the passage 16c includes an extension 20c which extends axially from the passage 16c. A tip 62 is provided with a passage 63 at right angles to the passage of the tip 20c and a small hole 64 in the tip 20c provides means for communication of the passage and tip 20c with the passage 63. Thus, the tip 62 provides means for mounting the tester vertically in a spark plug bore which extends horizontally into the engine. Also, bore 63 may be extended to the open end of the extension 20c so that the tip may be utilized in the place of tip 22 of the unit 10.

The device may be made in any desired shape, depending on the engines being overhauled. Other types of signals and pressure detecting means may be utilized for actuation of the signal indicating a build up of pressure. Any pressure detector, preferably, is adjustable so that signal may be actuated at any desired pressure. Thus, an engine with a compression of 60 lbs may use a pressure detector arranged to actuate a signal at 10 lbs, 20 lbs, etc. as desired. The higher pressures obviously are achieved as the piston approaches the end of the cylinder stroke. The thickness of the diaphragm material changes the pressure necessary for signal actuation, as do the strength of the spring biasing the piston.

What is claimed is:

1. In a combination with an automobile including an electrical system with signal components such as lights and a horn, an internal combustion engine and a driver's compartment wherein the engine may be cranked by turning the ignition key of the engine, a tester to indicate the compression stroke of the piston within a selected cylinder of the internal combustion engine and to operate a selected electrical signal component of the electrical system during the indicated compression stroke, said tester comprising:

(a) a comparatively small, tubular body having an internal bore therein, and a single inlet at one end of said internal bore;

(b) a tip end of the tubular body carrying a flexible, resilient tip thereon which is fittable into the spark plug bore of the engine cylinder with a gas tight fit, with said single inlet being at this tip end for communication between the cylinder and said internal bore of said body;

(c) a flexible, resilient, impervious diaphragm mounted within said tubular body adjacent the end opposite said tip and separating said internal bore into a large working pressure chamber, and an enclosed small ambient pressure chamber sealed from said working pressure chamber, said working pressure chamber being in communication with said single inlet and being otherwise substantially imperforate, whereby gas and air entering said working pressure chamber from said engine cylinder cannot escape, and the outer end of said enclosed ambient pressure chamber being closed by an end wall;

(d) a pressure responsive switch means in said enclosed ambient pressure chamber, and comprising: a first contact carried by said diaphragm and facing toward said end wall; and a second contact mounted within said enclosed ambient pressure chamber to confront said first contact in spaced relationship, and arranged to be engaged thereby in response to an increase of pressure within said working pressure chamber effective to move said diaphragm sufficiently toward said end wall;

(e) a first lead connected at one end thereof with said first contact; and (f) a second lead connected at one end thereof with said second contact, one of said first and said second leads being connectable with the power source of said electrical system and the other thereof being connectable with a signal component, whereby to actuate such signal component whenever said first and said second contacts of said switch means are closed in response to sufficient pressure from said engine cylinder.

* * * * *